UNITED STATES PATENT OFFICE.

WILLIAM BURNET, OF CHICAGO, ILLINOIS.

IMPROVEMENT IN ARTIFICIAL MARBLES.

Specification forming part of Letters Patent No. 152,459, dated June 30, 1874; application filed June 4, 1874.

*To all whom it may concern:*

Be it known that I, WILLIAM BURNET, of the city of Chicago, county of Cook and State of Illinois, have invented a new and useful Compound for the Production of Artificial Marble, of which the following is a specification:

My invention consists in the use of carbonate of lime, which is the most abundant of simple minerals, constituting the different varieties of calcareous spar, common lime, shell-lime, and lime made from lime-stone, marble, marl, chalk, bones, &c., with potash-alum, or with potash-alum and lime-water, as described hereafter. Substances containing magnesia should not be used. The dolomite marble should never be used, as it contains 45.6 per cent. carbonate of magnesia, 54.4 per cent. carbonate of lime, and no carbonic acid.

I use the lime or cement made from calcite, calcareous spar, which contains 56 per cent. lime and 44 per cent. carbonic acid.

In calcining or burning, the heat drives off the carbonic acid and leaves the lime in a pure state, called quicklime.

The cement or lime made from the pure white marble is the best for my purpose, as it contains mostly pure carbonate of lime.

With a solution of potash-alum and lime-water mixed, combined with carbonate of lime, I make a valuable cement, which is the whitest and hardest of all known cements, and may be molded into any form, after which it becomes as solid as natural marble; or the solution of potash-alum may be combined with the carbonate of lime, and the solution of lime-water omitted; or the lime-water may be applied after the marble has become hard, if desired.

My manner of working this compound is to make a paste or dough with the solution and carbonate of lime in a mortar-mill, or otherwise mix this compound thoroughly, and, while in a plastic state, mold it into ornaments in relief, busts, statues, flooring of bath-rooms, vestibules, mantels, table and stand tops, sepulchral monuments, and for all purposes for which natural marbles are used. Into molds made of wood, plaster-of-paris, gelatine, or otherwise, I force this plastic cement. When sufficiently hardened, (say in ten or twelve hours,) I remove it from the mold and fill up all cavities or defects with the same cement.

In polishing natural marble, a sponge saturated with pure, clean water is generally used to wash off the grit, snake or pumice stone, &c., on the marble.

Instead of pure, clean water, I use to polish my artificial marble, lime-water only, for the reason that by washing or saturating artificial marble frequently with lime water only, the surface so exposed to the air attracts carbonic acid, and becomes covered with a pellicle of insoluble, stony carbonate of lime, thereby greatly hardening it; and in order to harden it more speedily I saturate it with lime-water, and then, placing it in a chamber, exhaust the air therefrom in any well-known manner, and by any well-known or appropriate means fill the chamber with carbonic-acid gas, thus filling the pores with the gas, this process of filling the pores when *in vacuo* being similar to other known processes of saturating the stone with soluble silicates.

Carbon, as is well known, when sufficiently heated, unites with the oxygen of the air, and generates carbonic-acid gas. If, therefore, I wish to hasten the hardening of the marble by artificial means, I generate carbonic-acid gas in a close room (containing the marble-work) by means of a suitable portable furnace made of sheet-iron, filled with red-hot coals of coke or charcoal, heating and drying the marble, while generating the gas, (the marble absorbing both,) thus drying and strengthening itself by the same operation.

To prepare the molds for casting this composition, I rub them over thoroughly with oil, which will prevent the casting adhering to the molds, and will preserve them.

To color the composition, I use any pigment that may be necessary to give it such color as may be desired.

For imitating the natural black marbles, I recommend the use of the bone-charcoal without purification, as it contains all the calcareous salts. Bone-black will also answer to form the black color.

Oyster-shells make the richest and softest lime known, and contain 98.6 per cent. of carbonate of lime.

To prepare the lime-water used in my solution, I fill an air-tight vessel either with distilled, pure spring or rain water, into which I put an excess of lime, and stir it two or three minutes before allowing it to settle. After standing twelve hours, the clear solution may be drawn off (at any time needed) through a faucet, (placed above the lime,) or with a siphon.

The lime-water must be kept from the air, as it attracts carbonic acid, which it should not be allowed to do until used upon the marble. If exposed to the atmosphere it becomes covered with a pellicle of insoluble carbonate of lime, which renders it useless to apply to my artificial marble for effecting the purpose described.

To make the alum solution I use the potash-alum, as it sets the most delicate colors of the marble without spotting; and it is stronger and purer, although more expensive, than the ammonia or soda-alum of commerce. A strong solution of the latter will crack the marble and cause it to spot.

Potash-alum is composed of—

| | |
|---|---:|
| One part sulphate of potash, per cent.. | 18.34 |
| One part sulphate of alumina, per cent. | 36.20 |
| Twenty-four parts of water, per cent.. | 45.46 |
| | 100.00 |

Or, otherwise expressed:

| | |
|---|---:|
| Alumina | 10.82 |
| Potash | 9.94 |
| Sulphuric acid | 33.77 |
| Water of crystallization | 45.47 |
| | 100.00 |

Alum is incompatible with the alkalies and their carbonates, lime and lime-water, and sulphate of alumina and potash, for which reason I find it necessary in every case, when I use the two combined, to mix them thoroughly together, by violently agitating them, before using; otherwise part of the marble would be softer than other parts.

I may polish my artificial marble with pumice-stone and lime-water, and I finish it by passing oil lightly over it with a brush, and after drying I obtain a fine polish by rubbing it with a dry linen cloth, which completes the operation.

This marble has all the polish and frigidity of the natural marble. It can be employed in decorating churches and other public buildings, also in places exposed to drought or humidity. Frescoes can be applied to it with great facility, as the colors do not fade, but retain all their brilliancy. It also has the advantage over the natural marbles that it can be made of any desired area of unbroken surface without seams or clasps.

By adding suitable coloring matter to the composition while in a plastic state, I can produce durable and beautiful imitations of every variety of marble at a very small expense.

By means of plastic molds I can produce innumerable varieties of figures, and manufacture an endless assortment of marble statuary.

What I claim, and desire to secure by Letters Patent, is—

The composition herein described, consisting of potash-alum combined with carbonate of lime, either with or without lime-water, and for the purpose set forth.

WILLIAM BURNET.

Signed in presence of—
HENRY SONNENSCHEN,
F. H. STAADEN.